V. HENRI, A. HELBRONNER & M. VON RECKLINGHAUSEN.
APPARATUS FOR STERILIZING LIQUIDS BY MEANS OF ULTRA VIOLET RAYS.
APPLICATION FILED JUNE 7, 1910.
1,052,818.
Patented Feb. 11, 1913.
2 SHEETS—SHEET 1.
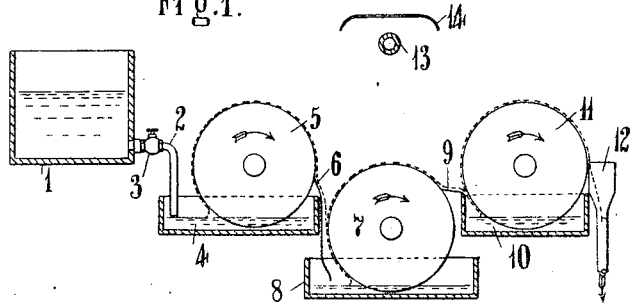
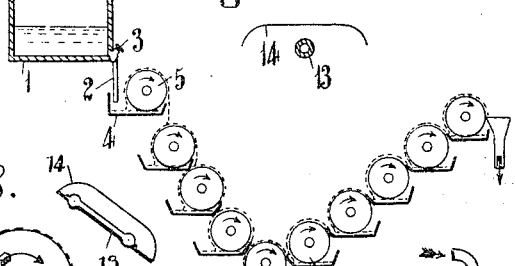
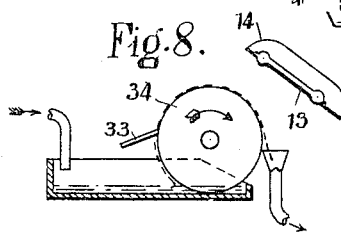
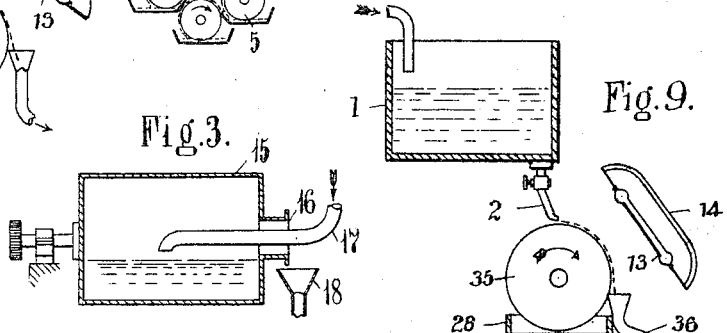
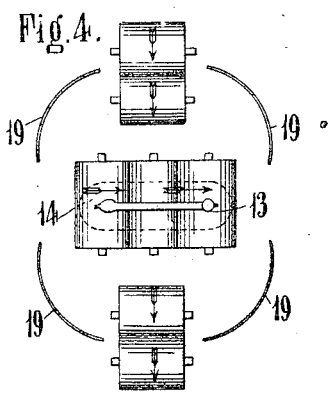
WITNESSES:
INVENTORS V. HENRI, A. HELBRONNER & M. VON RECKLINGHAUSEN.
APPARATUS FOR STERILIZING LIQUIDS BY MEANS OF ULTRA VIOLET RAYS.
APPLICATION FILED JUNE 7, 1910.
1,052,818.
Patented Feb. 11, 1913.
2 SHEETS—SHEET 2.
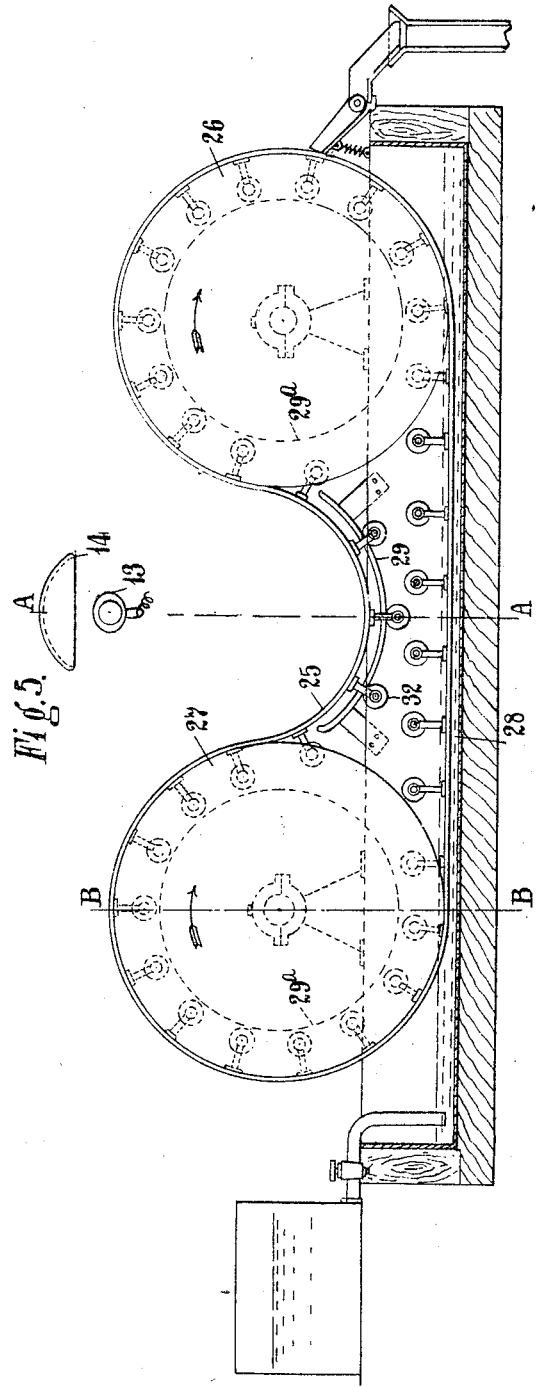
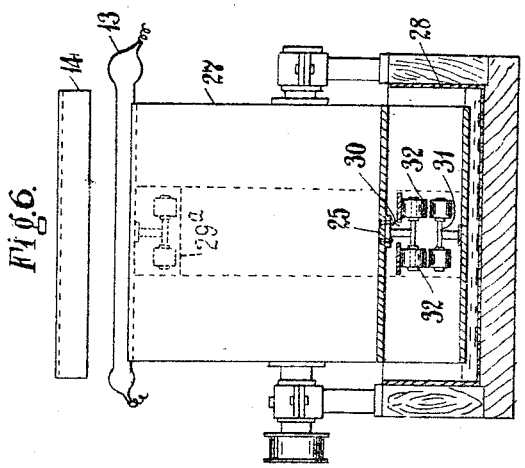
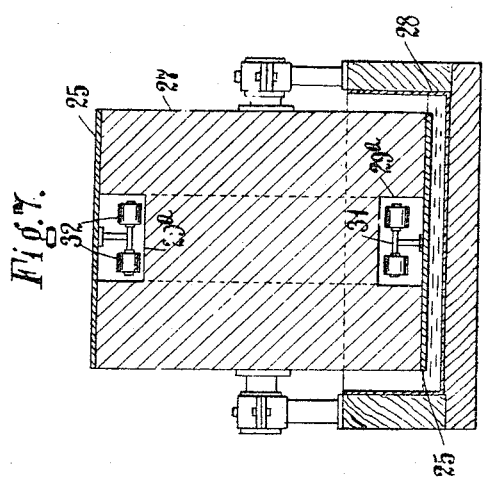

UNITED STATES PATENT OFFICE.

VICTOR HENRI, ANDRÉ HELBRONNER, AND MAX von RECKLINGHAUSEN, OF PARIS, FRANCE.

APPARATUS FOR STERILIZING LIQUIDS BY MEANS OF ULTRA-VIOLET RAYS.

1,052,818.  Specification of Letters Patent.  Patented Feb. 11, 1913.

Application filed June 7, 1910. Serial No. 565,610.

*To all whom it may concern:*

Be it known that we, VICTOR HENRI and ANDRÉ HELBRONNER, citizens of the Republic of France, and MAX VON RECKLINGHAUSEN, a subject of the Emperor of Germany, residing at Paris, France, have invented a new and useful Improvement in Apparatus for Sterilizing Liquids by Means of Ultra-Violet Rays, of which the following is a specification.

In the specification filed with our application for Letters Patent Serial Number 546,252, filed February 26, 1910, we have described a process for the sterilization of liquids by means of the action of ultra-violet rays, in which process, where the liquid to be sterilized possesses a high degree of opacity to the rays, we arranged that it shall be caused to flow in a thin film in order that all its particles may be exposed to the desired influence.

The present invention relates to improved apparatus for use in the process above mentioned, and especially to apparatus for producing thin films of liquid which may be exposed to the ultra-violet rays from a mercury vapor lamp or other suitable source.

We have found that many liquids, milk for example, do not under the action of gravity alone, form a sufficiently thin film to enable the liquid to be sterilized quickly and thoroughly. According to our invention therefore in order to avoid this difficulty and to obtain a very thin film of liquid, we provide an apparatus in which the liquid is acted upon by a force stronger than gravity, and for this purpose we utilize the forces due to surface tension. In making use of these forces we provide for withdrawing a continuous surface, such as that of a roller or band, from the liquid at a suitable rate, thereby drawing out a film of the liquid over said surface.

In order that the nature of our invention may be clearly understood, we will now describe the same by the aid of the accompanying drawings which are diagrams which illustrate, by way of example only, various methods of carrying out the same in practice.

Figure 1 is an elevation, partly sectional, showing arrangements for obtaining thin films by means of a number of rollers. Fig. 2 is a similar view showing an apparatus with a larger number of rollers arranged in a descending and ascending series. Fig. 3 is a sectional elevation illustrating an arrangement for cooling a roller by means of a stream of water directed upon its internal periphery. Fig. 4 is a plan illustrating another manner of arranging a plurality of rollers for obtaining thin films of liquid. Fig. 5 is an elevation, partly sectional, showing an arrangement of obtaining a thin film of liquid by means of an endless band. Fig. 6 is a section on the line A—A, Fig. 5. Fig. 7 is a section on the line B—B, Fig. 5. Fig. 8 is an elevation, partly sectional, illustrating how the thickness of the film on a roller may be regulated. Fig. 9 is an elevation, partly sectional, showing a further modified form of the apparatus.

Referring to Fig. 1, the liquid, the level of which is indicated by dotted lines, is delivered from a receptacle 1 through a pipe 2 provided with a graduating tap 3 into a tank 4; 5 is a roller, the periphery of which dips below the level of the liquid in the tank 4 as shown, and which is rotated in the direction of the arrow. By this means, owing to the surface tension of the liquid, a thin film of liquid indicated by the dotted line is spread over the surface of the roller. This is scraped off or collected by a plate 6, which delivers it on to the periphery of a second roller 7, or into a tank 8; the second roller being also driven in the direction of the arrow takes along with it a thin film of the liquid which is collected by a plate 9 and delivered into a tank 10, which is provided with a third roller 11. The film of the liquid from this third roller is finally delivered into a spout 12 by which it may be taken to receptacles, bottles, or other storage vessels. The film of liquid on the surface of the rollers 5, 7, and 11, is exposed to the ultra-violet rays from a source 13 here indicated by small circle which may be taken as a section of a mercury vapor lamp which is provided with a suitable reflector 14.

In Fig. 2 the rollers are shown arranged in a descending and ascending series, so as to surround the source of ultra-violet rays indicated at 13. The liquid is delivered from the periphery of one roller direct on to the periphery of the next roller in the descending series shown on the left hand side of the figure. In the ascending series on the right hand side of the figure, the liquid is collected from one roller and delivered into a tank located slightly above which cooperates with the next roller in the series.

Fig. 3 is a sectional view showing how the rollers may be water cooled. The roller is indicated at 15, and is provided with an opening 16 in its end, through which projects the water supply pipe 17, which delivers water within the roller. The excess of cooling water escapes by the orifice 16 into the delivery funnel 18 whence it is led to a suitable waste pipe. The rollers, over the surface of which the liquid to be sterilized is passed, may be arranged in various ways. For example, in Fig. 4 we have shown a set of seven rollers, three of which have their axes at right angles to the other four. The arrows show the direction of movement of the flow of liquid, and in place of using a brush or plate to scrape the film from the surface of each roller, adjacent rollers are placed with their peripheries in contact with each other so that the film is delivered from one roller to the next. In order to utilize as nearly as possible all the ultra-violet rays emitted by the source 13, this is provided with a reflector 14 and reflecting surfaces indicated at 19 are arranged in such a manner as to intercept the ultra-violet rays and reflect them on to the surface of the various rollers.

Figs. 5, 6 and 7 show the arrangement of an endless band for drawing out a film. The band is indicated at 25 being supported on rollers 26, 27 so that at one part of its passage it is immersed below the surface of the liquid to be sterilized which is contained in a tank 28. The loop or bight of the band is maintained in the position shown by guide rollers attached thereto which move within a fixed guide plate as will be understood from the sectional view, Fig. 6. The guide plate, which is of curved shape, is indicated at 29 and is provided with a central slot 30 through which passes the supporting arm of a bracket 31 on the ends of which the guide rollers 32 are rotatably mounted; said guide rollers engage with the under surface of the guide plate 29. The rollers 26, 27 which support and rotate the band, are each provided with an annular groove 29ª in the periphery for the reception of the guide rollers. A mercury vapor lamp 13 with a reflector 14 is again indicated as a suitable source of ultra-violet rays. Other devices may be employed for guiding the band.

Fig. 8 shows how a scraper, such as a plate 33 may be used to regulate the thickness of the film taken up by a roller 34.

In Fig. 9 the liquid is delivered from a receptacle 1 through a spout 2 directly on to the periphery of the roller 35, on the surface of which it is spread out in a thin film as indicated by dotted lines, being collected by a delivery plate and pipe 36. In this case the rotation of the roller 35 in the direction of the arrow assisted by the force of gravity acting on the liquid, reduces the film to the desired degree of attenuation.

By our improved apparatus a thin film of even thickness may be easily obtained, and a mixture of treated with untreated liquid, or a mixture of liquid that has been treated for a long period of time with liquid that has been only treated for a short time, can be avoided. Furthermore, the apparatus can be very easily ventilated, that is to say, any ozone produced can be readily dispersed by means of a suitable fan or other blowing device located adjacent to the rollers.

We claim as our invention:—

1. In apparatus for sterilizing liquids, the combination of a trough containing the liquid to be sterilized, a continuous surface located so that a portion thereof dips into the liquid in the trough, means for withdrawing said surface from the liquid so that a thin film is formed thereupon and means for exposing said film to the action of ultra-violet rays.

2. In apparatus for sterilizing liquids, a trough containing the liquid to be sterilized, a continuous surface located so that a portion thereof dips into the liquid in the trough, means for withdrawing said surface from the liquid so that a thin film is formed thereupon, a source of ultra-violet rays located in proximity to said surface, means for collecting the sterilized liquid from the moving surface and means for delivering liquid to said trough at the same rate as that at which it is removed by said collecting means.

3. In apparatus for sterilizing liquids, the combination of a trough containing the liquid to be sterilized, a roller adapted to be rotated and so located with reference to the liquid in the trough that a part of its periphery dips below the surface of the liquid, a source of ultra-violet rays located in proximity to said roller and means for collecting the sterilized liquid.

4. In apparatus for sterilizing liquids, the combination of a trough containing the liquid to be sterilized, a roller adapted to be rotated on an axis parallel to the surface of the liquid and so located with reference to the liquid in the trough that a part of its periphery dips below the surface of the liquid, a source of ultra-violet rays located in proximity to said roller and means for collecting the sterilized liquid.

5. In apparatus for sterilizing liquids, the combination of a roller adapted to be rotated, a trough containing the liquid to be sterilized from which said roller takes up the liquid, a source of ultra-violet rays located in proximity to said roller and means for collecting the sterilized liquid.

6. In apparatus for sterilizing liquids, the combination of a plurality of rollers adapted to be rotated, troughs containing liquid into which said rollers dip, a source of ultra-violet rays located in proximity to said rollers and means for delivering and collecting said liquid.

In testimony whereof we have hereunto subscribed our names this 25" day of May 1910.

VICTOR HENRI.
ANDRÉ HELBRONNER.
MAX von RECKLINGHAUSEN.

Witnesses:
DEAN B. MASON,
JACK K. BAKER.